United States Patent

Lioux

[11] 3,986,437
[45] Oct. 19, 1976

[54] DOUBLE-ACTING ROTARY HYDRAULIC JACK

[75] Inventor: Jean Lioux, Rueil Malmaison, France

[73] Assignee: La Precision Industrielle, Rueil-Malmaison, France

[22] Filed: Apr. 15, 1974

[21] Appl. No.: 461,233

[30] Foreign Application Priority Data
Apr. 24, 1973 France .......................... 73.14739

[52] U.S. Cl. .................... 92/5 R; 60/416; 60/418; 91/1; 91/420; 92/60; 92/106; 279/4
[51] Int. Cl.² ................ F01B 25/26; F01B 31/12; F15B 11/08; F15B 13/042
[58] Field of Search ............ 92/5 R, 60, 106; 138/31; 91/1, 420; 60/413, 416, 418; 279/4

[56] References Cited
UNITED STATES PATENTS

| | | | |
|---|---|---|---|
| 1,688,484 | 10/1928 | Carter | 92/5 R |
| 2,780,065 | 2/1957 | Spannhake | 138/31 X |
| 2,809,612 | 10/1957 | Highberg | 92/106 X |
| 3,042,121 | 7/1962 | Broetzman | 92/60 X |
| 3,145,662 | 8/1964 | Eickmann | 138/31 X |
| 3,369,464 | 2/1968 | Blattry | 91/420 |
| 3,529,835 | 9/1970 | Lewis | 138/31 X |
| 3,532,029 | 10/1970 | Roschupkin | 92/60 |
| 3,641,875 | 2/1972 | Kodalle | 91/420 X |
| 3,691,911 | 9/1972 | Visser | 91/1 X |
| 3,748,968 | 7/1973 | Pinto | 92/106 X |
| 3,780,621 | 12/1973 | Romell | 138/31 X |
| 3,892,165 | 7/1975 | Lioux | 91/420 |

*Primary Examiner*—Martin P. Schwadron
*Assistant Examiner*—Abraham Hershkovitz
*Attorney, Agent, or Firm*—Karl W. Flocks

[57] ABSTRACT

A double-acting rotary hydraulic jack having two jack compartments, comprising a rotary hydraulic joint for the supply of hydraulic liquid to and the evacuation of hydraulic liquid from the compartments. The two compartments of the jack each communicate with at least one axial boring in a rotary part of the jack which is not axially movable. In this boring a movable piston bears against the head of a guide rod for a spring which itself bears against the rotary part of the jack. The ends of the rods, externally of the borings, are secured to a member coaxial with the jack, for example a sleeve, whose axial position is monitored by a displacement detector, so as to give an indication of the working pressure in the active jack compartment.

7 Claims, 5 Drawing Figures

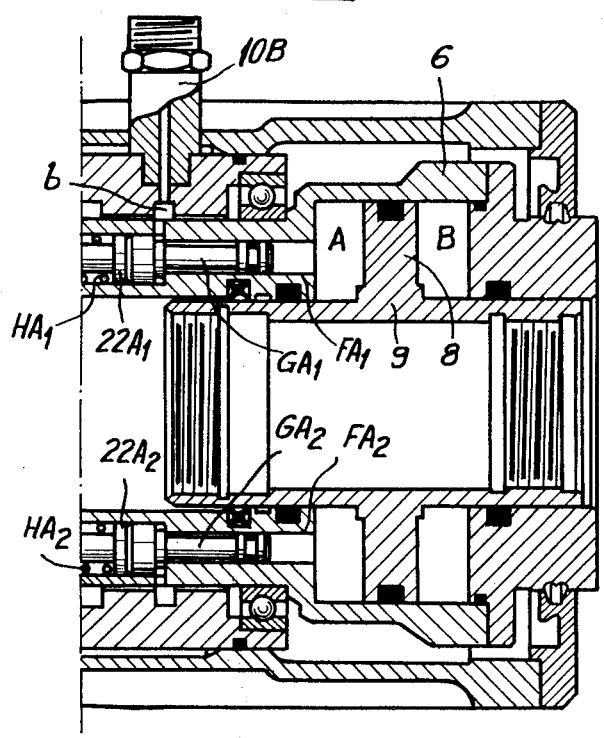

DOUBLE-ACTING ROTARY HYDRAULIC JACK

The present invention relates to a device for controlling the working pressure of a rotary jack such as that used for the control of a work-carrying chuck of a machine tool.

Rotary hydraulic jacks are already known in which the opposed compartments are fed from a fixed hydraulic station through a rotary hydraulic joint comprising a fixed part and a rotary part, the latter being rotatable very close to, but not in physical contact with, the fixed part. At least one of these parts is provided with grooves for the transfer of liquid between a passageway portion formed in the fixed part and another passageway portion formed in the rotary part, which passageway portions serve for the supply of hydraulic liquid to a compartment of the rotary jack and for the return of liquid from this compartment to a tank.

In its most simple embodiment, such a rotary jack requires permanent feeding of hydraulic liquid under pressure, due to the constant loss of liquid from the annular gap between the fixed and rotary parts of the rotary joint.

In order to avoid the disadvantage, it has already been proposed to provide the passageway portion in the rotary parts which serve the jack compartments with non-return devices for the liquid in the form of valves or slides, and to compensate the hydraulic pressure drops due to losses at these valves or slides, by means of resiliently-urged hydraulic pressure accumulators. Furthermore, in the Specification of my co-pending U.S. Patent Application serial No. 348,598 filed on Apr. 6, 1973, now U.S. Pat. No. 3,892,165. I have described a hydraulic pressure accumulator comprising a differential piston which permits not only the maintenance, in the jack compartments, of the feed pressure of the hydraulic fluid, but the multiplication of this pressure in an arbitrary manner.

In view of the employment of non-return devices, it is not only possible, but advantageous, to interrupt the feeding of the jack with liquid under pressure, since it is then possible, and described in the Specification of my co-pending U.S. Pat. application Ser. No. 459,279 filed on April 9, 1974, to expel the liquid trapped in the annular gap of the rotary joint, employing a blast of gas under pressure. This has the effect of reducing the internal friction of the rotary joint.

Embodiments of rotary jacks with non-return devices obviously prevent all manometric control of the pressure reigning in the active compartment of the jack. Nevertheless, it is important to achieve precise and permanent control of the effective pressure reigning in the active compartment of a rotary jack, since this ensures safe operation of the jack. This is especially important in the case of a jack controlling a work-holding chuck, since the unlocking of a workpiece which is rotating rapidly can have very serious consequences.

The present invention aims to provide a rotary jack having permanent and automatic monitoring of the pressure reigning in turn in the two compartments of the jack. According to the invention, a double-acting rotary jack comprising two compartments communicating with a fixed hydraulic station via a rotary hydraulic joint, is characterised in that the two compartments of the jack each communicate with at least one axial boring in a rotary part of the jack which is not axially movable, in which boring a movable piston bears against the head of a guide rod for a spring which itself bearing against the rotary jack, while the ends of the rods, externally of the borings are secured to a member coaxial with the jack whose axial position is monitored by a displacement detector.

Preferably, in order to balance the forces to which said coaxial member is subjected in service, each compartment of the jack communicates with at least two of said axial borings distributed equally around the axis of the rotary jack, each of these borings containing a piston a rod with a head and a spring counteracting the pressure of the liquid on the piston.

In such an embodiment, the pistons corresponding to a compartment of the jack placed under pressure repel the heads of the corresponding guide rods, thus compressing the springs which surround them and causing axial displacement of said coaxial member. The latter displaces the guide rod or rods corresponding to the borings associated with the compartment which is not placed under pressure, so that, through the intermediary of their respective heads, these latter rods also compress their springs.

Thus, since during operating of the jack, one or other of its compartments is placed under pressure, all the springs are compressed, so that a predetermined axial displacement of the coaxial member coresponds to a definite working pressure which is applied to one or other of the jack compartments. Moreover, the borings with their pistons and compression springs, associated with one compartment of the jack, constitute for the latter a multi-piston pressure accumulator, which is particularly advantageous for rotary jacks which include non-return devices.

In addition, and preferably, the pistons may be of the differential kind, for example the kind described in specification of my co-pending U.S. patent application Ser. No. 348,598 filed on Apr. 6, 1973. Such pistons can provide a pressure-mutliplying effect in the compartments of the jack.

The position detector for the sleeve may be of any type. However, in order to avoid physical contact of solid bodies which would cause friction and wear the detector is preferably a proximity detector of photoelectric, magnetic or capacitative type.

The invention will now be described, by way of example, with reference to the accompanying drawings, in which:

FIG. 4 is a partial section taken on the line IV-IV of FIG. 2, and

FIG. 5 is schematic circuit diagram of a rotary jack in accordance with the invention.

Figure 1:
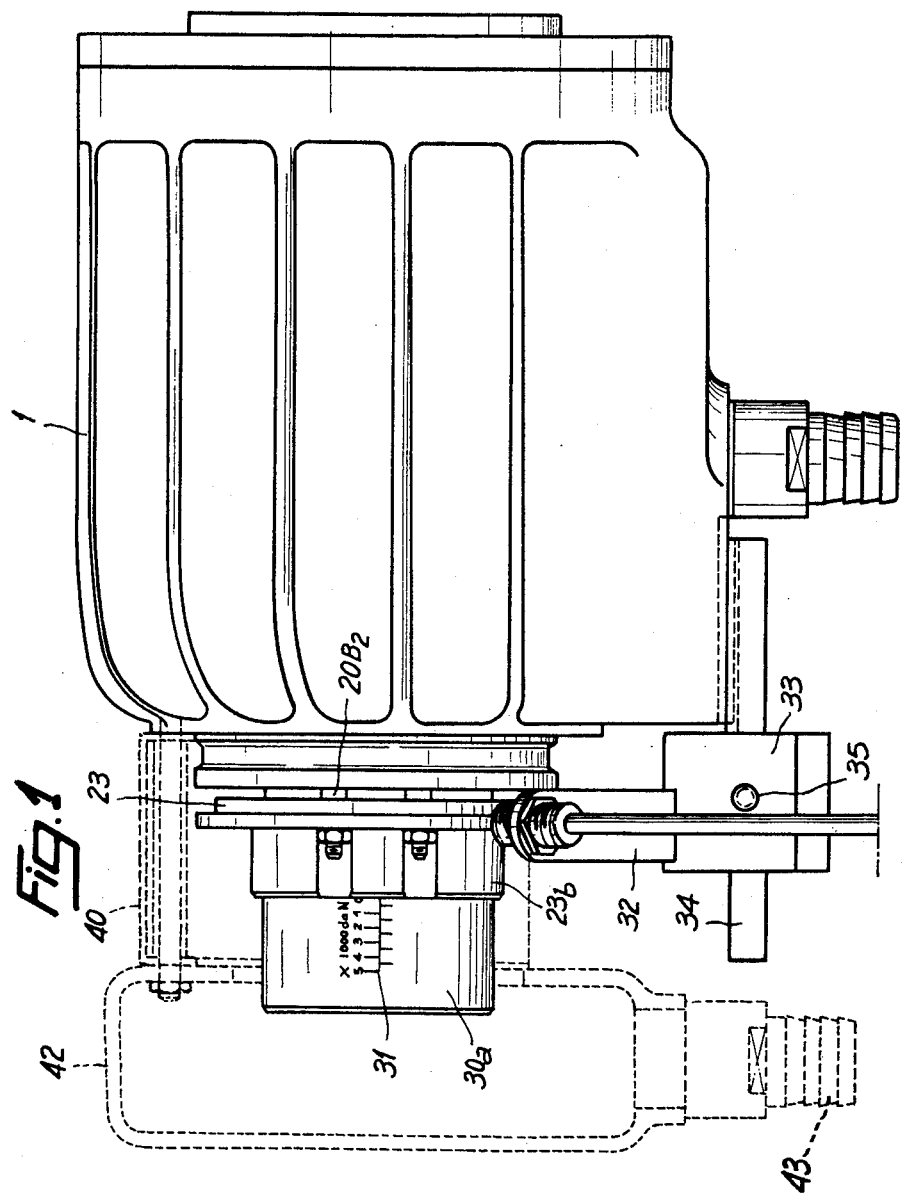
FIG. 1 is a side view of a rotary jack in accordance with the invention.

The rotary jack illustrated in the drawings includes a casing 1 which collects the losses of the liquid (hereinafter referred to as oil) which serves for the control of the jack.

In this casing is inserted the fixed part 2 of the rotary hydraulic joint which is centred and supported by bearings 3 and 4 in relation to a tubular extension 5 of the cylinder of the jack. This tubular extension 5 forms the rotary part of the jack which contains the rotary portions of the passageways which supply oil to and withdraw it from the two compartments A and B of the jack. A narrow annular slot 19 is formed between the two parts 2 and 5.

Figure 2:
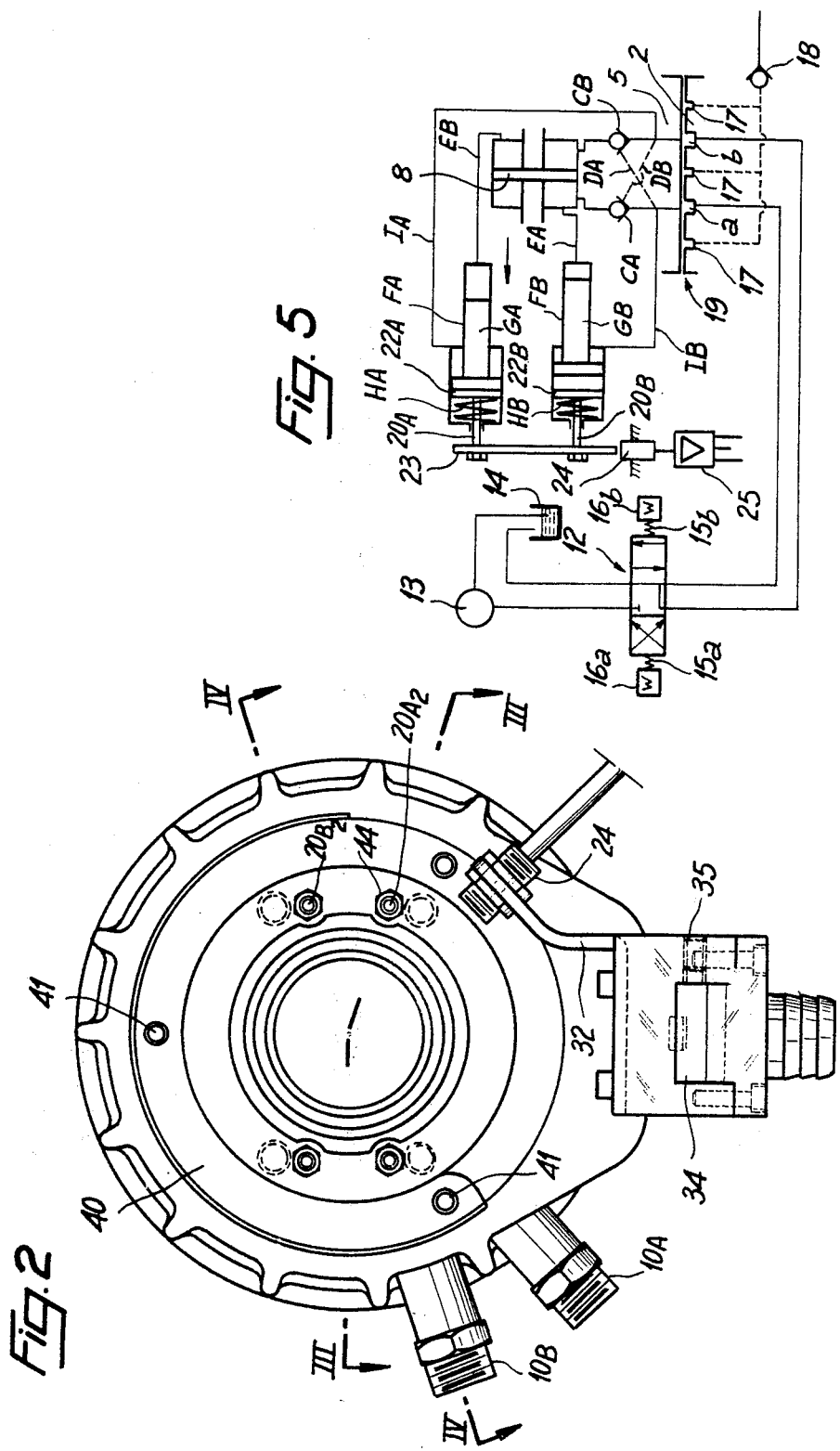
FIG. 2 is an end view of the jack of FIG. 1.
Figure 3:
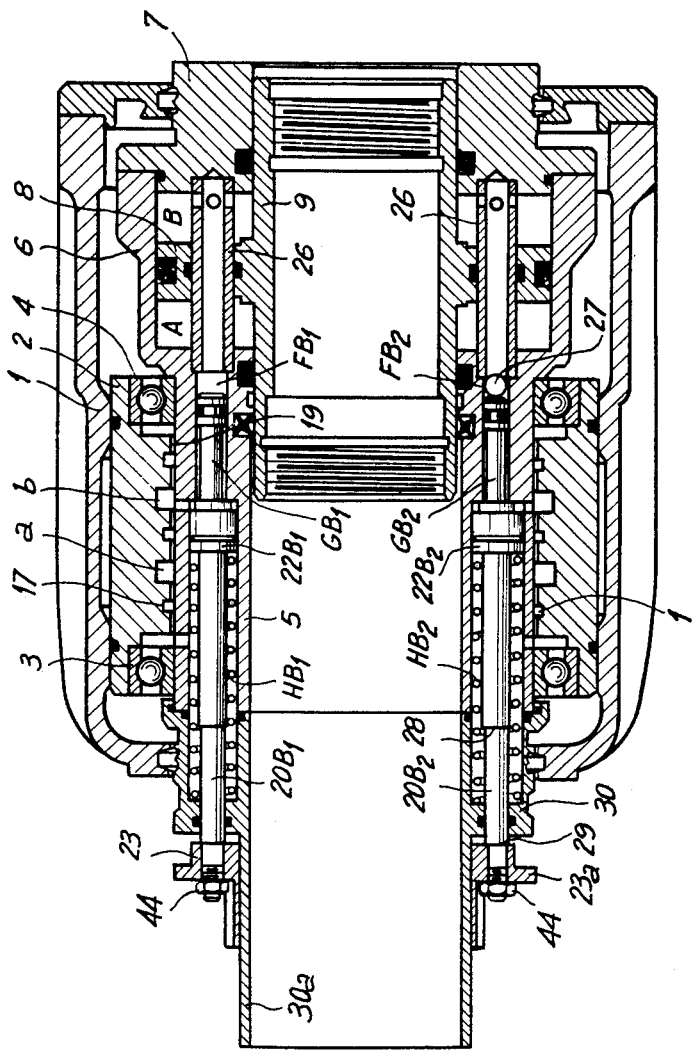
FIG. 3 is a section taken on the line III—III of FIG. 2.

In the cylinder 6 of the jack, which is closed by an end cover 7, there is a movable annular piston 8 secured to a sleeve 9 coaxial with the extension 5. The sleeve 9 serves to connect the jack with a member (not shown) which it controls, for example the tubular control spindle of a chuck of a machine tool. In order to supply oil to and evacuate it from each of the compartments of the jack, the fixed part 2 includes two grooves *a* and *b* which are in communication, via pipe unions 10A and 10B, with a hydraulic distribution system 10 which is not shown in FIGS. 1–4 but is shown schematically in FIG. 5.

By means of a set of axial, radial and transverse borings (not shown, and which constitute the rotary portions of the passageways), the grooves *a* and *b* are in communication (see FIG. 5) with the compartments A and B of the jack through non-return devices CA and CB (for example valves), respectively. To enable operation of the jack, it is known that the non-return devices associated with the compartments A and B must be openable by the pressure of the oil applied to the compartments B and A, respectively, which, in the schematic drawing of FIG. 5, is illustrated by the pipe connections DA and DB shown in dotted lines. In practice this forced opening of the non-return devices results from the action of pistons moved by the control pressure, as disclosed in the patent applications previously mentioned.

In order to maintain the pressure in the active compartment of the jack, each compartment A, B communicates, via a respective conduit EA and EB, with a boring FB, FA containing a piston GB, GA biased by a resilient force, which advantageously is provided by a compression spring HB, HA.

In the embodiment shown schematically in FIG. 5, the pistons GA and GB are differential pistons.

The control pressure upstream of a non-return valve CA or CB is transmitted via the non-return valve to the associated compartment A or B and is also transmitted, via an associated auxiliary passageway IB or IA, to the annular space in the corresponding cavity FB or FA. This increases the compression of the spring HB or HA and as a result, increases the pressure in the corresponding jack compartment when the control pressure is released.

The control pressure is obtained via a distributor 12 from a source 13 of oil under pressure. The latter takes the oil from a tank 14 which collects the return oil. The distributor 12 has a slide valve which can adopt one of three positions this slide valve being maintained in a mid position by opposed springs 15a and 15b. The slide valve can be displaced positively in opposition to one of these springs by the attraction of one of a pair of oppositely acting electro-magnets 16a, 16b.

In the mid-position of the slide valve of the distributor 12, shown in FIG. 5, the two grooves *a* and *b* are placed in communication with each other and in communication with the tank 14. In one or other of the end positions of the slide valve, one of the two grooves *a* and *b* is in communication with the source 13 of oil under pressure and the other is in exhaust connection with the tank 14.

Finally, when the slide valve of the distributor is in its mid-position (shown in FIG. 5), it is possible to expel oil remaining in the annular slot 19 comprised between the rotary part 5 and the fixed part 2 by compressed air delivered to auxiliary grooves 17 from a compressed air source (not shown) via a non-return valve 18. This is done to avoid temperature rises due to the friction resulting from relative movement of the inter-penetrating limit layers of oil which, in the annular gap 19, adhere respectively to the relatively moving parts 2 and 5.

For more detailed information regarding construction and operation of pressure multiplying devices, the non-return devices and the air sweeping device, reference should be made to the aforesaid co-pending applications and to French application Ser. No. 73,13662.

Patent which was filed under French Ser. No. 73.13662 on Apr. 16, 1973 and published as U.S. Pat. No. 2,241,708 on Mar. 21, 1975. HA and HB are mounted on guide rods 20A and 20B and bear against heads 22A and 22B, respectively, at one end of these rods. The other ends of the rods 20A and 20B project from the rotary part 2 and are fixed to a sleeve 23.

Thus, when the compartment B is fed, to cause movement of the jack piston 8 from right to left (as viewed in FIG. 5), the piston GA is subjected to the control pressure both on its small cross-section and on its annular cross-section, so that it forces the head 22A to compress the spring HA and to move the sleeve 23. In performing this movement the sleeve 23 moves the rod 20B so that, by means of th head 22B, the spring HB is also compressed to the same degree.

The displacement of the sleeve 23 is thus a measure of pressure reigning in the compartment B. Furthermore, since the cross-section of the compartment A, and the cross-sections of the piston GB, are equal to the corresponding cross-sections of the compartment B and the piston GA, respectively, and since the placing under pressure of the compartment A also leads to the compression of the two springs HA and HB, the displacement of the sleeve 23 measures, to the same scale, the force exerted by the jack in one or the other of its two directions of movement.

Moreover, since the pressure in the active compartment of the jack is maintained constant (either by the maintenance in service of the source 13, or by the non-return valve CA or CB and the action of the respective piston GB or GA of maintaining the pressure or an over-pressure), the sleeve 23, in the absence of loss of pressure in the active compartment, always occupies the same position when the piston 8 is at the end of its stroke in one direction or the other.

It is therefore possible, by means of a proximity detector 24 connected to an amplifier 25, to obtain a signal which can be employed as an alarm or as a control for stopping the rotation of the machine to which the jack is connected as soon as a variation in position of sleeve 23 appears.

If the sleeve 23 is of ferromagnetic metal, it is suitable to use an electro-magnetic proximity detector the field of which is closed by the edge of the sleeve. A variation of field corresponding to a small displacement, for example several tenths of a millimeter, then triggers the operation of the detector. However, the detector must be disconnected from circuit automatically during the times when either of the electro-magnets 16a, 16b of the distributor 12 is energised, that is as long as the distributor is not in its mid-position.

FIGS. 1 to 4 show a practical embodiment of a rotary jack in accordance with the invention.

To each compartment A and B these correspond two diametrically opposed borings $FA_1$, $FA_2$ and $FB_1$, $FB_2$. The borings $FB_1$, $FB_2$, communicate with the compartment B by tubes 26 traversing the piston 8, which tubes also prevent relative rotation between the piston 8 and its cylinder. A transverse bore 27 permits the passage of oil between the compartment B and the hydraulic station.

The sleeve 23 is connected to four rods $20A_1$, $20A_2$, $20B_1$, $20B_2$. These rods each have two shoulders, one of which, 28, limits compression of the springs $HA_1 \ldots HB_2$, and the other, 29, of which ensures the fixing of the sleeve 23 by nuts 44 threaded on the ends of the rods.

In order to increase the precision of the detection, the sleeve 23 has a thin peripheral flange 23a. In addition, the sleeve 23 is provided with a cylindrical extension 23b which slides on the cylindical extension 30a of a socket 30, which closes the ends of the various borings provided in the extension 5 of the jack cylinder.

When the rotary part of the jack is at rest, it is possible to read the displacement imposed by the oil pressure on the sleeve 23 on a scale 31 engraved on the extension 30a. The displacement of the sleeve is, in fact, proportional to the pressure of the oil supplied to one of the compartments of the jack.

In the case of a lathe, for example, this scale may be graduated directly in terms of the force exerted on the work-holding chuck, so that the operator knows immediately the force exerted by the jack without having to resort to a calculation involving the working surface of the piston 8, the control oil pressure, the multiplication coefficient of the differential accumulator pistons GA, GB (FIG. 5) and the efficiency of the jack. In order to permit adjustment of the position of the detector 24, the latter is carried by a bracket 32 secured to a slide-block 33 movable along a slideway 34 fixed to the lower part of the casing 1. A screw 35 clamps the detector in position after its position has been adjusted.

A cover 40, maintained in place by screws 41, serves to protect the external portion of the device. This cover may also serve to support a collector 42 for the washing liquid which, on a machine tool, may travel along the tubular spindle of the latter which carries the rotary jack. The liquid collected in this way is evacuated or recovered via a union 43.

Since a warning, accompanied if necessary by stoppage of the machine, may be obtained at the beginning of a displacement of the sleeve 23, i.e. upon the occurrence of a lowering of pressure in the jack, without total disappearance of this pressure, the safety of operation of such a rotary jack is very high.

In addition, by increasing the number of pistons (simple or differential) which, in addition to the surveillance and the control, permit the maintenance of the pressure in the compartments of a rotary jack provided with non-return devices, the safety of operation is also increased. In order to increase the sensitivity of detection, it is also possible to increase the length of the springs loading these pistons, which also increases the safety by increasing the volume of oil filling the hydraulic accumulators or pressure multipliers. Since the placing under pressure of a compartment of the jack ensures the deformation of all the springs associated with the two compartments, these springs can be very flexible and, as a result, very easy to callibrate.

The invention is applicable especially to the control of work-holding chucks of machine tools.

What is claimed is:

1. A double-acting rotary hydraulic jack comprising a stationary annular member, a cylinder-shaped member rotatably mounted in said annular member in a coaxial relationship therewith, a piston-shaped member slidably mounted in said cylinder-shaped member and defining therein two fluid-tight compartments having variable volumes, said stationary member and cylinder-shaped member being adapted to form together a rotary hydraulic joint, means for selectively connecting one of said compartments to a stationary source of a hydraulic liquid under pressure, said connecting means comprising said rotary hydraulic joint and non-return devices adapted to retain the hydraulic pressure in each of said compartments, at least two bores axially extending in said cylinder-shaped member and communicating at one end with said two compartments respectively, pistons slidably mounted in said axial bores, guide rods having each one end connected to one of said pistons and another end engaged in the other end of the respective axial bore and freely protruding outside of said cylinder-shaped member, spring means for biasing the respective one ends of said guide rods towards said pistons, a ring-shaped member connected to the respective free other ends of said guide rods, and detector means for sensing the axial position of said ring-shaped member.

2. A rotary jack according to claim 1, in which each compartment of the jack communicates with at least two of said axial borings, said axial borings being distributed equally around the axis of the jack.

3. A rotary jack according to claim 1, in which the rotary jack is tubular and the coaxial member is a sleeve surrounding a tubular extension of the body of the jack.

4. A rotary jack according to claim 1, in which the pistons having annular sections are differential pistons which under the action of the control pressure on their annular sections, have a multiplying effect on the pressure in the jack compartments.

5. A rotary jack according to claim 1, in which the axially movable coaxial member has a ferromagnetic circular periphery and the displacement detector means is electromagnetic.

6. A rotary jack according to claim 3, in which said tubular extension includes a scale permitting, when the jack is at rest, an estimation of the position of the sleeve.

7. A rotary jack according to claim 6, characterised in that the scale is graduated in terms of the force supplied by the rotary jack.

* * * * *